United States Patent [19]

Sliemers et al.

[11] Patent Number: 4,778,721
[45] Date of Patent: Oct. 18, 1988

[54] METHOD OF FORMING ABRASION-RESISTANT PLASMA COATINGS AND RESULTING ARTICLES

[75] Inventors: Francis A. Sliemers; Uma S. Nandi; Philip C. Behrer; George P. Nance, all of Columbus, Ohio

[73] Assignee: Battelle Memorial Institute, Columbus, Ohio

[21] Appl. No.: 883,620

[22] Filed: Jul. 9, 1986

[51] Int. Cl.$^4$ ............................................. B05D 3/02
[52] U.S. Cl. ..................................... 428/336; 427/38; 428/412; 428/429; 428/447; 428/450; 428/457
[58] Field of Search ................... 427/38; 428/336, 412, 428/429, 447, 450, 457

[56] References Cited

U.S. PATENT DOCUMENTS

| | | | |
|---|---|---|---|
| 4,018,945 | 4/1977 | Mehalso | 427/41 |
| 4,096,315 | 6/1978 | Kubacki | 428/412 |
| 4,137,365 | 1/1979 | Wydeven et al. | 428/412 |
| 4,374,717 | 2/1983 | Drauglis et al. | 204/192 |
| 4,435,476 | 3/1984 | Phillips et al. | 428/412 |
| 4,492,733 | 1/1985 | Phillips et al. | 428/412 |

OTHER PUBLICATIONS

"Techniques and Applications of Plasma Chemistry", a Wiley-Interscience Publication, John Wiley & Sons, copyright 1974.

*Primary Examiner*—Bernard D. Pianalto
*Attorney, Agent, or Firm*—Mueller and Smith

[57] ABSTRACT

Disclosed are improved abrasion-resistant plasma coatings adapted to be coated onto substrates including polymeric substrates, glass, and metal. The method of plasma coating the substrates comprises restricting the monomer to be a silane, disiloxane, silazane, or disilazane which is substituted with at least one alkoxy group per silicon atom wherein the alkoxy group is selected from methoxy groups, ethoxy groups, and mixtures thereof. The plasma coating is applied under plasma coating conditions for a time adequate to form an abrasion-resistant coating having sufficient thickness so as to possess a Taber abrasion resistance of less than 10% haze development after 100 cycles. Abrasion resistance of some disclosed coatings is less than about 5% development after 1,000 cycles.

20 Claims, No Drawings

METHOD OF FORMING ABRASION-RESISTANT PLASMA COATINGS AND RESULTING ARTICLES

BACKGROUND OF THE INVENTION

The present invention relates to plasma polymerization and more particularly to a highly abrasion-resistant plasma coating.

The term plasma polymerization refers to the deposition of films of organic material by subjecting vapors of organic materials to a glow discharge. Plasmas typically are characterized by their electronic temperature and density. In a glow discharge process, the average electron energy ranges from about 1:10 eV with ne ranging from about $10^9$–$10^{12}$ cm$^{-3}$. In such plasmas, a large difference in the electron temperature, $T_e$, and the gas temperature, $T_p$, is present. Typically, $T_3$ is about 10 to 100 times larger than $T_p$. Thus, it is possible to have a plasma in which the gas temperature is at room temperature while the electrons have sufficient energy to rupture molecular bonds and generate highly active species. Because of this, glow discharge plasmas also have been called "cold plasmas". Coating by plasma polymerization inherently is an ultra-thin film technology which heretofore has been practical only for those applications in which a very thin film is sufficient for obtaining the desired properties. Thin film limitations result from the low deposition rates typically encountered in plasma polymerization and because thick films tend to be unstable because of their extreme hardness and residual strains due to the high degree of cross-linking.

Prior proposals for producing abrasion-resistant plasma coatings include U.S. Pat. No. 4,435,476 which applies an organosiloxane coating liquid to a solid substrate followed by exposure of the coated substrate to glow discharge treatment under vacuum. U.S. Pat. No. 4,137,365 proposes to improve the abrasion resistance of a polymerized organosilane coating on a plastic substrate by treating the silane-coated substrate in an oxygen plasma. This same oxygen post-treatment technique also can be found in U.S. Pat. No. 4,018,945. U.S. Pat. No. 4,096,315 proposes to coat an optical plastic substrate by first exposing the substrate in an evacuated plasma polymerization chamber to a first plasma that forms hydroxyl groups on the substrate surface; then plasma coating said substrate with a silicon-containing monomer; and then exposing the coated substrate to a third plasma consisting of a noble gas, oxygen, nitrogen, or air. U.S. Pat. No. 4,492,733 forms a plasma polymerized coating from tri-functional silanol molecules followed by a post-plasma treatment in a vacuum.

Despite these and other proposals in the art, abrasion-resistance of plasma coatings still is a problem. For example, in coating polymeric substrates for use in optics, it is desirable to produce a plasma-applied film which possesses non-glare characteristics and an abrasion resistance of less than about 5% optical loss after 100 cycles in a Taber abrasion resistance test as described in ASTM D4060-81.

BROAD STATEMENT OF THE INVENTION

The present invention addresses the abrasion resistance problems which prior plasma coatings have experienced. In particular, the present invention is directed to a highly abrasion-resistant plasma coating which coating may be a non-glare coating (dependent on type and substrate) and which is highly suited for use on optical polymeric substrates (e.g. fibers, films, sheet, etc.). The present invention is an improvement in a method for plasma coating a polymeric or other substrate with a polymerizable silicon-containing monomer under plasma coating conditions to form an abrasion-resistant coating on said substrate. This improvement comprises restricting the monomer to be a silane, disiloxane, silazane, or disilazane which is substituted with at least one alkoxy group per silicon atom and selected from methoxy groups, ethoxy groups, and mixtures thereof. The plasma coating method is conducted under conditions and for a time adequate to form an abrasion-resistant coating having sufficient thickness so as to possess less than 5% optical loss after about 100 cycles of Taber abrasion resistance testing. The plasma coatings of the present invention are typified by being much thicker than prior coatings, such thickness ranging on up from about 1 to 5 microns. The resulting plasma-applied coating also forms another aspect of the present invention.

Advantages of the present invention include the ability to provide plasma coatings which are superior in abrasion resistance. Another advantage is the ability to achieve such abrasion-resistance coatings on a variety of polymeric substrates. A further advantage is that the time necessary to form such plasma coatings is sufficiently short to make the process commercially attractive. These and other advantages will be readily apparent to those skilled in the art based upon the disclosure contained herein.

DETAILED DESCRIPTION OF THE INVENTION

The plasma coatings of the present invention are unique in that their unusual hardness appears to be dependent both upon the choice of monomer and the thickness of the coating applied. Use of conventional monomers, even at thicker coating levels, does not result in the production of coatings possessing the unusual hardness which the plasma-applied coatings of the present invention possess. The same can be said of the use of the monomers disclosed herein wherein the applied film thickness is insufficient. With the correct selection of monomers and coating thickness, however, the instant coatings can pass 100, 500, and even up to 1,000 cycles of Taber abrasion resistance. In fact, coatings which have tested to be harder than glass also have been made in accordance with the precepts of the present invention. Yet with such hardness, the present plasma coatings still possess the required adhesion and other film properties which are necessary for a good coating. For example, the coatings may be non-glare coatings and do not readily delaminate from the substrate under a variety of test conditions. Also, the present plasma coatings possess sufficient clarity that they find application as optical coatings as demonstrated in the Examples.

The monomers which are suitable for use in forming the plasma coatings of the present invention are restricted to be selected from a silane, a disiloxane, a silazane, or a disilazane wherein the monomer is substituted with at least one alkoxy group per silicon atom. The alkoxy group is selected from a methoxy group, an ethoxy group, or mixtures thereof. The remaining substituents on the silicon-based monomer typically will be lower alkyl groups with methyl and ethyl groups predominating. It is not fully understood why the presence of alkoxy groups translates into hardness of the coatings nor why the presence of alkoxy groups in the coating monomer translates into harder coatings dependent upon film thickness. Use of conventional monomers such as tetramethylsilane, hexamethyldisiloxane, or the like does not result in coatings which are as hard as the present coatings nor coatings which possess unusual hardness depending upon film thickness. Representative preferred monomers for use in accordance with the present invention include, for example, tetramethoxysilane, methyltrimethoxysilane, dimethyldimethoxysilane, trimethylmethoxysilane, tetraethoxysilane, dimethyltetramethoxydisilazane, 1,1,3,3-tetramethyl-1,3-diethoxydisiloxane, and mixtures thereof.

The second important restriction placed on the inventive process relates to the plasma coating process being conducted under conditions and for a time adequate to form an abrasion-resistant coating having sufficient thickness so as to possess a Taber abrasion resistance of less than about 10% haze development after 200–500 cycles. It appears that only average abrasion resistance of the coatings is experienced at thinner films even though the alkoxy-substituted monomers are used. It appears that at a certain minimum film thickness, however, a break point in the hardness curve is realized and unexpectedly much superior abrasion resistance results. As noted above, this same phenomenon appears to be lacking when utilizing conventional alkyl-substituted silicon-based plasma monomers. Depending upon the particular monomer, the particular plasma coating conditions, and even the composition of the substrate, different film thicknesses will be necessary in order for the hardness criteria to be met. Typically, however, the minimum film thickness should be at least about 1 micron and such film thickness can range on up to 5 microns or more. Even though the coatings are relatively thick compared to prior art coatings, the time necessary for achieving these thicknesses typically is restricted to about 1 hour or less, though longer time periods can be tolerated on occasion. A one hour coating time is believed to be acceptable for commercial scale implementation of the present invention.

A variety of substrates can be coated in accordance with the precepts of the present invention. Since optical coatings are a preferred use for the present plasma coatings, polymeric substrates (both rigid and flexible) and particularly optical-grade polymeric substrates are preferred for coating with the present process. Such optical substrates include, for example, polycarbonate, various acrylics, polystyrene, styrene-acrylonitrile copolymers, polymethylpentene, various vinyls, allyl diglycol carbonate, polysulfones, and the like. With respect to the substrate of choice, it should be noted that clarity and hardness (e.g. cross-linking density) can be controlled and improved for certain substrates by the use of oxygen as a co-monomer during the plasma polymerization process. It has been found in general that acrylic substrates do not require the presence of co-monomer oxygen, but that polycarbonate substrates, for example, on occasion can be coated with more abrasion resistant coatings and coatings of improved clarity by utilizing oxygen as a co-monomer. This aspect of the present invention is not understood fully either. It should be noted, also, that the use of oxygen as a co-monomer has been determined to also impart improved clarity and hardness to conventional plasma coatings which utilize conventional monomers such as, for example, tetramethylsilane, hexamethyldisiloxane, hexamethyldisilazane, and the like. The proportion of oxygen co-monomer typically should range from between about 5 and 30% by volume.

When speaking of substrates, it also should be recognized that the alkoxy-substituted monomers of the present invention have been successfully coated onto brass which is a soft metal substrate. Thus, it appears feasible to coat a variety of substrates including, for example, copper, aluminum, and other metals; metal surfaces of metalized coatings, e.g. metalized plastics; glass; and a variety of additional substrates. The ability to coat soft metals further underscores the uniqueness of the inventive plasma coatings disclosed herein.

Next, it should be understood that the use of an acetonitrile (ACN) primer coating on various substrates has been determined to provide improved coatings. Heretofore, the use of acetonitrile primers was restricted to improving the adhesion of sputtered chromium or chromium metal alloys to urethane substrates as disclosed in U.S. Pat. No. 4,374,717. It has surprisingly been discovered during the course of research on the present invention that the adhesion of polymerized silicon-based plasma coatings can be improved by the use of acetonitrile primers on various substrates, particularly metal substrates.

Plasma coatings can be applied in a variety of conventional plasma reactors, such as those reactors described in U.S. Pat. No. 3,847,652. Likewise, conventional plasma coating conditions can be utilized as described in the art discussed above, for example. Process variables include substrate pretreatment, power level, monomer pressure and flow rate, carrier gas pressure and flow rate, substrate temperature, and like variables. It will be appreciated that the monomer of choice must be sufficiently volatile that vapors of the monomer can be generated readily for forming the cold plasma for application to a substrate.

While the preferred use for the inventive plasma coatings involves optical polymeric substrates, a variety of additional applications for the present invention can be envisioned readily. Such additional applications include, for example, the plasma coating of surgical implants, polymeric containers such as blood bags, as a controlled rate of release coating for drugs, as a dielectric film in electrical applications, as a moisture barrier coating, as an anti-reflective coating of plastic optical components, as a corrosion-resistant coating, as a coating for magnetic recording media, as a coating for reverse osmosis and gas separation membranes, and like uses.

The following examples show how the present invention has been practiced, but should not be construed as limiting. In this application, all units are in the metric system, all temperatures are in degrees Centigrade, unless expressly indicated to the contrary. Also, all citations are expressly incorporated herein by reference.

EXAMPLES

EXAMPLE 1

Hexamethyldisiloxane (HMDS) monomer was compared to methyltrimethoxysilane (MTMOS) and trimethylmethoxysilane (TMMOS) in order to demonstrate the benefits realized by the alkoxy substituents. Polycarbonate substrates were coated in a conventional reactor much like that described in U.S. Pat. No. 3,847,652 utilizing an RF generator to generate the plasma. The plasma coated polycarbonate substrates then were subjected to Taber abrasion resistance testing (ASTM D4060-81) and the percent haze recorded. Note that the cited test employs a CS-10 wheel and a 500-gram load.

TABLE 1

POLYCARBONATE SUBSTRATE

| Monomer | | RF | | Coating | Taber Testing | |
|---|---|---|---|---|---|---|
| Type | Pressure (microns) | Flow Rate (cc/min) | Power (watts) | Time (min) | Thickness (micron) | Cycles | % Haze |
| HMDS | 34 | 10.96 | 125 | 60 | 4.8 | 50 | 42.1 |
| MTMOS | 14 | 10.18 | 125 | 60 | 3.6 | 400 | 8.5 |
| TMMOS | 34 | 10.42 | 125 | 60 | 4.2 | 150 | 6.3 |

The above-tabulated results clearly demonstrate the unexpected, yet excellent performance which the alkoxy substituted silane monomers exhibit compared to their alkyl counterpart. Such performance is realized with thinner coatings compared to the HMDS coating.

EXAMPLE 2

The optical qualities of uncoated and tetramethoxysilane (TMOS) coated acrylic substrates was evaluated. Plasma coating conditions for the TMOS monomer included: 46 micron pressure, 10.89 cc/min. flow rate, 100 watts RF power, 60 minute coating time, and a 4.1 micron coating thickness. The following results were recorded.

TABLE 2

ACRYLIC SUBSTRATE

| Sample Type | Before Abrasion Testing | | After 500 Cycles Abrasion Testing | |
|---|---|---|---|---|
| | Transmissivity (%) | Haze (%) | Transmissivity (%) | Haze (%) |
| Uncoated | 93.7 | 0.44 | 90.8 | 30.5 |
| TMOS | 93.5 | 0.48 | 92.8 | 2.4 |

The above-tabulated data demonstrates that TMOS plasma-applied coating provides the same optical qualities as does the acrylic substrate itself. After abrasion testing, however, the TMOS coated substrate retained its transmissivity better than did the uncoated acrylic substrate. More importantly, however, is the very low 2.4% haze reading for the TMOS plasma-coated acrylic substrate which is vastly superior compared to the 30.5% haze reading for the uncoated acrylic substrate.

EXAMPLE 3

Polystyrene was plasma coated with TMOS monomer in order to demonstrate the anti-glare properties which may be achieved. Plasma coating conditions included: 60 microns pressure, 11.10 cm/min flow rate, 75 watts audio, and 30 minutes coating time. The following results were recorded.

TABLE 3

POLYSTYRENE SUBSTRATE

| Sample Type | Before Abrasion Testing | | After 100 Cycles Abrasion Testing | |
|---|---|---|---|---|
| | Transmissivity (%) | Haze (%) | Transmissivity (%) | Haze (%) |
| Uncoated | 86.0 | 2.6 | — | — |
| TMOS | 90–91 | 0.9–3.5 | 88–92 | 1.4–4.9 |

The above-tabulated results again reveal a very abrasion-resistant coating which exhibits excellent anti-glare properties.

EXAMPLE 4

Polycarbonate substrates were plasma-coated with dimethyldimethoxysilane (DMDMOS) and tetramethyldiethoxysiloxane (TMDEODS) in order to further demonstrate efficacy of the present invention. The following test results were recorded.

TABLE 4

POLYCARBONATE SUBSTRATE

| Monomer | | RF | | Coating | Taber Testing | |
|---|---|---|---|---|---|---|
| Type | Pressure (microns) | Flow Rate (cc/min) | Power (watts) | Time (min) | Thickness (micron) | Cycles | % Haze |
| DMDMOS | 34 | 10.12 | 125 | 60 | 3.8 | 200 | 4.9 |
| TMDEODS | 28 | 7.71 | 125 | 30 | 2.3 | 100 | 5.4 |

Again, the superior results exhibited by the alkoxy-substituted silane monomers are demonstrated in the above-tabulated results.

EXAMPLE 5

An unusual attribute of the monomers disclosed herein is that coating thickness affects coating performance (e.g. hardness). This same effect is not seen using conventional all-alkyl substituted monomers. Polycarbonate substrates were plasma coated with TMS and MTMOS monomers as follows:

TABLE 5

POLYCARBONATE SUBSTRATE

| Monomer | | RF | | Coating | Taber Testing | |
|---|---|---|---|---|---|---|
| Type | Pressure (microns) | Flow Rate (cc/min) | Power (watts) | Time (min) | Thickness (micron) | Cycles | % Haze |
| TMS | 38 | 10.35 | 125 | 30 | 0.7 | 100 | 38.5 |
| TMS | 16 | 10.40 | 125 | 60 | 3.4 | 200 | 20.2 |
| MTMOS | 11 | 10.35 | 125 | 30 | 1.9 | 100 | 6.1 |
| MTMOS | 14 | 10.18 | 125 | 60 | 3.6 | 400 | 8.5 |

From these data, it will be observed that an increase in coating thickness results in an increase in coating hardness, as measured by abrasion resistance. This same coating thickness/hardness correspondence is not observed with conventional HMDS or like all-alkyl monomers. This can be seen by referring to Example 1 wherein comparative HMDS at a much thicker coating thickness (viz. 4.8 mm) did not pass 100 cycles abrasion resistance.

EXAMPLE 6

The beneficial effect which may be achieved by use of oxygen as a comonomer was investigated using TMOS and polycarbonate substrates.

TABLE 6

POLYCARBONATE SUBSTRATE

| Monomer | | RF | | | Coating | Taber Testing | |
|---|---|---|---|---|---|---|---|
| Type | Pressure (microns) | Flow Rate (cc/min) | Power (watts) | Time (min) | Thickness (micron) | Cycles | % Haze |
| TMOS | 16 | 10.40 | 125 | 60 | 3.4 | 200 | 20.2 |
| TMOS/O$_2$ | 37/10 | 10.90/3.66 | 125 | 60 | 4.7 | 500 | 2.5 |

Dramatic performance improvement is demonstrated in the above-tabulated data by the addition of oxygen as a comonomer.

We claim:

1. In a method for plasma coating a substrate with a polymerizable silicon-containing monomer under plasma coating conditions to form an abrasion-resistant coating on said substrate, the improvement which comprises:
   (a) restricting said monomer to be a silane, disiloxane, silazane, or disilazane which is substituted with at least one alkoxy group per silicon atom and selected from methoxy groups, ethoxy groups, and mixtures thereof; and
   (b) conducting said plasma coating under conditions and for a time adequate to form an abrasion-resistant coating having sufficient thickness so as to possess a Taber abrasion resistance of less than 10% haze development after 100 cycles.

2. The method of claim 1 wherein said coating has a sufficient thickness so as to possess an abrasion resistance of less than 10% haze development after 200 cycles.

3. The method of claim 1 wherein said coating has a sufficient thickness so as to possess an abrasion resistance of less than 10% haze development after 500 cycles.

4. The method of claim 1 wherein said monomer is selected from the group consisting of tetramethoxysilane, methyltrimethoxysilane, dimethyldimethoxysilane, trimethylmethoxysilane, tetraethoxysilane, dimethyltetramethoxydisilazane, 1,1,3,3-tretamethyl-1,3-diethoxydisiloxane, and mixtures thereof.

5. The method of claim 1 wherein said substrate is flexible or rigid.

6. The method of claim 1 wherein said substrate is selected from the group consisting of a polymeric substrate, a metal substrate, or glass.

7. The method of claim 6 wherein said substrate is a polymeric substrate selected from the group consisting of polycarbonate, acrylic, polystyrene, styrene-acrylonitrile copolymers, polymethylpentene, vinyl, ally diglycol carbonate, and polysulfone.

8. The method of claim 1 wherein oxygen is utilized as a comonomer.

9. The method of claim 8 wherein said oxygen comonomer is present in a proportion ranging from between about 5 and 30 volume percent.

10. The method of claim 1 wherein said plasma coating is conducted for a time adequate to form a coating having a thickness ranging from between about 0.7 and 5 microns.

11. The method of claim 10 wherein said coating thickness ranges from between about 1 and 5 microns.

12. A substrate prepared according to the process of claim 1.

13. The substrate of claim 12 wherein said substrate is selected from the group consisting of a polymeric substrate, a metal substrate, and glass.

14. The substrate of claim 13 which comprises a polymeric substrate.

15. The substrate of claim 14 which is flexible or rigid.

16. The substrate of claim 14 wherein said plasma coating is made from a monomer selected from the group consisting of tetramethoxysilane, methyltrimethoxysilane, dimethyldimethoxysilane, trimethylmethoxysilane, tetraethoxysilane, dimethyltetramethoxydisilazane, 1,1,3,3-tretamethyl-1,3-diethoxydisiloxane, and mixtures thereof.

17. The substrate of claim 14 which is formed from said monomer and oxygen as a comonomer.

18. The substrate of claim 14 wherein said oxygen comonomer is present between about 5 and 30 volume percent.

19. The substrate of claim 12 wherein said coating thickness ranges from between about 0.7 and 5 microns.

20. The substrate of claim 14 wherein said coating thickness ranges from between about 0.7 and 5 microns.

* * * * *